United States Patent [19]

Higuchi

[11] 3,729,947

[45] May 1, 1973

[54] PROCESS FOR STORING BLOOD PLATELETS

[75] Inventor: Takeru Higuchi, Lawrence, Kans.

[73] Assignee: ALZA Corporation, Palo Alto, Calif.

[22] Filed: Dec. 4, 1970

[21] Appl. No.: 95,353

[52] U.S. Cl. ..............................62/60, 62/78, 62/62, 195/1.8, 424/101
[51] Int. Cl.......B65b 63/08, C12k 9/00, A61k 17/00
[58] Field of Search ......................195/1.8; 424/101; 62/60

[56] References Cited

UNITED STATES PATENTS

| | | | |
|---|---|---|---|
| 2,786,014 | 3/1957 | Tullis | 195/1.8 |
| 2,662,520 | 12/1953 | McMahon | 128/1 |

*Primary Examiner*—Sam Rosen
*Attorney*—Paul L. Sabatine and Steven D. Goldby

[57] ABSTRACT

A process for storing blood platelets while simultaneously preserving the viability and integrity of the platelets by maintaining the platelets at a pressure of 100 to 1,000 psi and at a temperature of just above the freezing temperature of the platelets to about ambient temperature. The platelets may be stored alone or with platelet preserving agents.

5 Claims, No Drawings

PROCESS FOR STORING BLOOD PLATELETS

BACKGROUND OF THE INVENTION

This invention pertains to a novel and useful process for storing blood platelets. More particularly, the present invention relates to an improved process for storing platelets while essentially preserving their function and integrity and simultaneously inhibiting platelet aggregation by maintaining the platelets under a positive pressure and at a temperature just above the freezing temperature of the platelets to about ambient temperature. An aspect of the invention concerns maintaining the platelets under the stated pressure and temperature conditions in intimate combination with chemical platelet preserving agents.

A critical need exists for an acceptable means for preserving platelets. The need for preserving platelets arises because platelets are administered as platelet transfusions when indicated for mammals with thrombocytopenia, significant bleeding, leukemia and lymphoma, in bone marrow depression from radiation or drug chemotherapy and for generally maintaining vascular integrity and for other like uses. The need for an acceptable means for perserving platelets also exists because presently available preserving or storing methods most frequently lead to unacceptable features, such as, platelet stickiness or platelet aggregation, to changes in the platelet's shape from a normal disc-shape platelet into a swelled globular cell form and to a marked decrease of platelet viability.

The presently available, or the prior art methods for preserving platelets frequently involved the addition of anti-clumping agents such as moniodacetate, p-chloromercuribenzoate, methylmercuric nitrate and the like to whole blood before the platelets were separated therefrom; but these reagents possess the serious inherent disadvantage that in the concentrations employed a large amount of the preserving reagent is transported with the separated platelets to the recipient and thereby inducing unwanted and un-needed chemicals, often possessing biologically harsh side effects, into the recipient. Other methods for storing platelets involved the short-term storage of platelets at room temperature but this frequently leads to platelet clumping, to a change of the platelet's shape and to decreased viability of the platelets. The long-term storage of platelets in the frozen or the near frozen state has in general been accompanied by a marked loss of viability for the stored platelets as measured by their capacity for survival in thrombocytopenic recipients. The prior art experiences with platelets stored in the freeze-dried state have not been seen as an art acceptable method because of its inherent failure to produce reconstituted viable platelets having a role in the management of health and disease.

Thus, in the light of the above discussion it will be readily appreciated by those versed in the subject art that a need exists for a means for storing platelets that is essentially free from the tribulations associated with the prior art. Likewise, it will be further appreciated by those skilled in the art that if a new and useful method for storing platelets is made available to the art, said means would have a positive medical value and it would also represent a substantial contribution to the art.

Accordingly, it is an immediate object of this invention to provide a novel and useful method for storing blood platelets.

Another object of the invention is to provide a method for storing platelets while simultaneously preserving the platelet's function and integrity.

Yet another object of the present invention is to provide a method that easily lends itself to increased terms for storing platelets that are maintained essentially-free of platelet aggregation and retain their viability.

Another object of the invention is to provide a method for storing platelets that keeps the platelets under pressure and at a temperature just above the freezing temperature of the platelets to ambient temperature.

Still yet another object of the present invention is to provide a method for storing platelets that maintains platelets under positive pressure and a low temperature while keeping the platelets' viability and integrity.

Yet still another object of the invention is to provide a method for storing platelets under pressure and at a low temperature in combination with platelet preserving agents.

These objects as well as other objects, features and advantages of this invention will become more readily apparent to those skilled in the art from the following detailed description and accompanying claims.

SUMMARY OF THE INVENTION

The invention concerns a novel process for storing mammalian blood platelets for long term storage thereof while simultaneously essentially inhibiting platelet aggregation and maintaining the platelet's integrity and viability by storing the platelets under a pressure of 100 to 1,000 psi and at a temperature range of just above the freezing temperature of the platelets to ambient temperatures. The platelets can be stored in combination with anti-aggregation prostaglandins.

DESCRIPTION OF THE INVENTION

In attaining the objects, features and advantages of the present invention, it has now been surprisingly found that by using the unobvious method of the invention for storing platelets for increased length of time, non-aggregated stored platelets having platelet integrity and platelet viability can be prepared by storing the platelets in plastic bags under a pressure of 100 to 1,000 psi and at a temperature range of just above the freezing temperature of the platelets to about ambient temperature. The platelets can be stored under the stated conditions alone or in combination with platelet preserving prostaglandins.

In performing the process of the invention, platelets are separated from fresh, whole blood by standard techniques. For example, fresh whole blood, about 430 ml, is collected into a container containing about 70 ml of acid-citrate-dextrose anti-coagulant solution and the container is centrifuged at 375 × g for about 15 minutes in a refrigation centrifuge at 20°C. After completion of the centrifuge period, the upper plasma portion containing the platelets is separated from the lower blood portion and transferred to a new container. About 220 ml of platelet-rich plasma is transferred from the first container to the second container. Next, the platelets are separated from the plasma by centrifuging the container housing the plasma-rich platelets at 1,500 × g for 15 minutes and at 20°C to produce a separation of the platelets from the plasma. The upper plasma portion that separated from the platelets is decanted from the container, and the viable, non-aggregated platelet concentrate now is ready for storing according to the process of the invention.

The platelets, as above collected, can be separated and collected in a commercially available, conventional plastic bag, blood-plasma-platelet three bag system that is routinely employed by hospitals and blood banks. Also, the platelets can be harvested by any acceptable methods and then transferred to a plastic container or to a plastic bag for storing in a hydrostatic pressurized vessel.

The plastic bags suitable for the process and storing of platelets are plastic bags fabricated from commercially available materials that are biologically acceptable for contacting mammalian tissues, blood and organs. The biologically acceptable polymeric materials generally exhibit desirable properties such as non-toxicity, flexibility, non-irritability, chemical stability, and ease of manufacture into plastic containers or plastic bags suitable for the purpose of the invention. Exemplary of polymeric materials include polyolefins such as polyethylene and polypropylene, elastomeric polymers such as polybutadiene, halogenated polymers such as polyvinylchloride, polytetrafluoroethylene and polychlorotrifluoroethylene, and other acceptable polymers such as polymethylmethacrylate, polyacrylonitrile, polyethylene terephthalate, butadiene-vinyl-pyridine copolymer, polyamides, polysilicone and the like.

Next, the plastic bag containing the platelets separated from the plasma as above described and usually art known as a "platelet concentrate" comprising a volume of about 20 to 25 ml is placed in a pressurizable vessel for processing according to the spirit of the invention. The pressurizable vessel is generally a pressure vessel of cylindrical, spherical, square, round, or like geometric shape, and it is capable of withstanding pressures exerted by the material enclosed. The pressure vessel or container is constructed to carry pressures of 100 psi to 1,000 psi and temperatures from about 0°C to ambient temperature. The vessel may be of any of the commercial pressure vessels constructed of stainless steel, of heavy forgings welded together of rolled sheets and formed ends fastened into unit construction and of similar vessels. Pressure vessles are well known to the art and they are discussed in *Encyclopedia of Science and Technology*, Vol 10, pages 585 to 586, McGraw-Hill. The vessel is also equipped with a commercially available motor driven liquid pump or manually operated hydraulic pump coupled with an intensifier to produce the desired hydrostatic pressure. The pressure in the vessel can be easily ascertained with conventional pressure gauges to show the internal hydrostatic pressure, as reported in *Encyclopedic Dictionary of Physics*, Vol, 3, pages 692 to 696, 1961, Pergamon Press Inc.

In actual processing of a platelet concentrate in a plastic bag, the plastic bag is placed into a pressure vessel, the vessel sealed and a liquid pumped into the vessel.

The liquid operable for the purpose of the invention can be any liquid that can be made to transmit pressure to the platelet container upon application of pressure to the liquid. Exemplary of suitable liquids are water, saline, saturated brine solutions, sea water, methyl glycol, ethylene glycol, propylene glycol, glycerin, hexamethylene glycol, alkanols, mixtures thereof, and any other pressure transmitting liquid that does not readily diffuse through the platelet container wall. The liquid is pumped into the vessel until a pressure of 100 pounds per square inch (psi) to 1,000 psi is reached.

The operable pressure for storing the platelets is any pressure within 100 psi to 1,000 psi where the platelets can be stored to maintain their functionality. The temperature of the liquid in the vessel for storing the platelets is cooled by a series of cooling coils positioned within the vessel or by cooling the liquid outside the vessel and pumping cooled liquid into the vessel. The platelets are easily stored in the vessel at a temperature of just above the freezing point of the platelets to about ambient temperature, that is, from about 2° to 25°C. Generally, the platelets are stored at a temperature of 10° to 15°C. According to the spirit of the invention a pressure temperature relationship is made available to the art for storing the platelets, such as a pressure of 100 psi and a temperature of 10°C; a pressure of 100 psi and a temperature of 15°C; a pressure of 250 psi and a temperature of 18°C; and at like pressure temperature relationships for storing the platelets. The pressure within the pressure vessel can be maintained at lower pressures for storing a small number of bags, or the pressure within the vessel can be increased to higher pressures if a large number of plastic bags are stored in the vessel. For example, water can be pumped into the vessel until a pressure of 1,000 psi is obtained and then rapidly cooling the contents to 10°C.

The platelets in the plastic bags may be stored in combination with prostaglandin that prevent the clumping or aggregation of platelets. The prostaglandins can be added to the platelets in the plastic bag or the plastic bags may be coated with a platelet anti-aggregation prostaglandin. The prostaglandins that possess platelet anti-aggregation properties that may be present in the bag or present on the polymeric surface are the prostaglandins of the "E" series and they are a member selected from the group consisting of $11\alpha,15(S)$-dihydroxy-9-oxo-13-trans-prostenoic acid, $11\alpha,15(S)$-dihydroxy-9-oxo-13-trans-8-iso-prostenoic acid, $11\alpha,15(S)$-dihydroxy-9-oxo-13-trans-$\omega$-homo-prostenoic acid, mixtures thereof, and the pharmaceutically acceptable non-toxic salts thereof. The amount of prostaglandin used depends on the amount of plasma or plasma-rich-platelet concentrate being processed. Generally, about 50 nanograms (0.05 microgram) to about 1000 nanograms (1 microgram) of prostaglandin will be used for each 1 milliliter of plasma-rich-platelet concentrate and about 100 nanograms (0.1 microgram) is used for each ml of plasma.

The prostaglandin when present on the surface of the plastic bag can be applied to the plastic by art known techniques, such as immersing the polymeric surface into a prostaglandin solution, for example, a 10 percent ethyl acetate solution of $11\alpha, 15(S)$-dihydroxy-9-oxo-13-trans-prostenoic acid for 1 to 24 hours to coat the prostaglandins onto the polymeric surface. The prostaglandins can also be applied onto the polymeric surface by first mixing a platelet antiaggregation prostaglandin with an organic solvent, such as acetone, and then immersing the plastic in the acetone prostaglandin solution to render the plastic surface prostaglandin coated. The prostaglandin can also be applied by mixing the prostaglandin with a plasticizer and applying the mixture to the plastic surface. Generally about 0.1 microgram to 200 micrograms of biologically active platelet aggregation inhibiting prostaglandin for each centimeter square of polymer surface exposed to the platelets is acceptable for acting in combination with the process of the invention for preventing platelet clumping during storage of the platelets. In copending applications U.S. Ser. No. 65,317 filed Aug. 19, 1970 and U.S. Ser. No. 71,255 filed Sept. 10, 1970, are disclosed methods for preparing platelet concentrates and methods for treating plastic surfaces with platelet anti-aggregation prostaglandins. These copending applications are assigned to the assignee of this invention and their disclosures are incorporated herein by reference.

In actual operation that demonstrated the addition of a prostaglandin to plasma, first, 430 ml of fresh whole blood is collected into the first pack of a conventional triple-pack with 70 ml of acid citrate dextrose in the first pack. The blood pack is centrifuged at 375 $g$ for 15 minutes, and about 200 ml of plasma is removed from the first pack. Next, 20 micrograms of $11\alpha,15\alpha$-dihydroxy-9-oxo-13-trans-prostenoic acid is added to the plasma, present in the second pack, and the plasma-rich-platelet-prostaglandin pack is centrifuged at about 1,500 $g$ for 15 minutes to concentrate the platelets and the supernatuant plasma is transferred to the third pack. About 20 to 25 ml of platelets suspended in a few ml of plasma is left in the second pack. The second pack containing the platelet concentrate is then stored in a pressure tank containing water at ambient temperature, the tank is sealed and water pumped into the tank to raise its internal pressure to 500 psi, and then rapidly cooled to 10°C to effectively store the platelets.

Having thus described the invention and various embodiments thereof, it is to be understood that the disclosure is not to be construed as limiting, as these embodiments and other variations will be obvious to those versed in the art from reading the present specifications and appended claims.

I claim:

1. A process for storing platelets wherein the process comprises storing the platelets at a pressure of 100 to 1,000 psi and at a temperature of 2° to 25°C while essentially preserving the viability and integrity and inhibiting aggregation of the platelets.

2. A process for storing platelets according to claim 1 wherein the platelets are stored at a pressure of 100 to 1,000 psi and at a temperature of 10° to 15°C.

3. A process for storing platelets according to claim 1 wherein the platelets are stored at a pressure of 100 to 1,000 psi and at a temperature of 2° to 25°C and in combination with a platelet anti-aggregation prostaglandin selected from the group consisting essentially of $11\alpha,15(S)$-dihydroxy-9-oxo-13-trans-prostenoic acid, $11\alpha,15(S)$-dihydroxy-9-oxo-13-trans-8-iso-prostenoic acid, $11\alpha,15(S)$-dihydroxy-9-oxo-13-trans-$\omega$-homo-prostenoic acid, mixtures thereof and the pharmaceutically acceptable salts thereof.

4. A process for storing platelets according to claim 1 wherein the platelets are stored at a pressure of 100 to 1,000 psi and at a temperature of 2° to 25°C and wherein the platelets are stored in a container that transmits the pressure and the temperature to the platelets.

5. A process for storing platelets according to claim 1 wherein the container is a plastic container.

* * * * *